Aug. 31, 1965   E. W. GARNISH   3,203,828
FILM ADHESIVE CONSISTING OF POLYVINYL ACETAL RESIN
AND PHENOL-FORMALDEHYDE RESIN
Filed June 28, 1962

United States Patent Office 3,203,828
Patented Aug. 31, 1965

3,203,828
FILM ADHESIVE CONSISTING OF POLYVINYL ACETAL RESIN AND PHENOL-FORMALDEHYDE RESIN
Edward William Garnish, Saffron Walden, England, assignor to Ciba Limited, Basel, Switzerland, a company of Switzerland
Filed June 28, 1962, Ser. No. 205,857
Claims priority, application Great Britain, July 7, 1961, 24,729/61
3 Claims. (Cl. 117—122)

This invention relates to adhesive self-supporting films used in bonding articles together.

Processes for joining metals and other impervious adherends by means of synthetic resin adhesives are recognized as circumventing many of the disadvantages of older methods such as screwing or riveting. Thus, structures can be designed having greater strength and rigidity without a corresponding increase in either bulk or weight and, in addition, the manufacture of new types of material such as honeycomb sandwich has been made practical.

Many types of adhesive are now manufactured and sold as thin dry self-supporting films. In this form the labour and cost of spreading liquid adhesive by brush and spray, and the time involved in removing solvents by evaporation, is eliminated. Adhesives in film form are particularly convenient for use in the preparation of honeycomb sandwich structures where the areas to be treated with adhesive may be large.

This invention is particularly concerned with improvements to film adhesives and, more particularly, to those having as component a polyvinyl acetal resin and a phenol formaldehyde resin which is usually, though not necessarily, of the resole type. The term "polyvinyl acetal resin" is used herein as a generic name for the class of resins which includes polyvinyl formal, acetal and butyral.

In such films the acetal may be present as discrete and visible particles embedded in a sheet of the phenol formaldehyde resin, or the two components may be intimately mixed, in which case the film is apparently homogeneous. In a third type the phenol formaldehyde resin is present as a coating on both sides of a continuous film of the acetal. Such films are dry and self-supporting. In use they are cut to the required shape, placed between the adherends, and the assembly maintained under pressure at an elevated temperature until the adhesive has cured.

In large structures the areas to be glued may form a complicated, discontinuous pattern and this gives rise to great difficultly in that a dry film adhesive of the type previously described tends to sag and slip during assembly of the structure. A consequence of this is that bonds cannot always be formed in accurately specified positions.

It has now been found that this difficulty may be overcome by providing a film adhesive of the type hereinbefore described with a coating, on one or both sides, of a tacky substance of suitable properties.

According to the present invention therefore, there is provided a film adhesive which comprises a substrate consisting of a monolayer or multilayer film comprising a polyvinyl acetal resin and a phenol-formaldehyde resin and, on one or both sides thereof, a layer of a tacky substance which retains its tackiness during storage of the film at room temperatura but is itself cured to a hard, insoluble, infusible resin under the conditions of temperature and pressure which will effect a cure of the film adhesive. This latter characteristic ensures that the initial presence of the tacky substance will not deleteriously affect the properties of the final bond.

The tacky coating may be a solution of a phenol-formaldehyde resole resin and a polyvinyl acetal, preferably polyvinyl butryal, in a non-volatile solvent or plasticiser, e.g. trixylenyl phosphate, dibutyl phthalate, polyethylene glycols having molecular weights within the range 150–700 or polypropylene glycols having molecular weights within the range 400–2500.

In order to illustrate the invention, reference is made to the accompanying drawing. It presents a cross-sectional view of the film adhesive of the present invention. The film adhesive consists of the substrate film of a polyvinyl acetal resin and a phenol-formaldehyde resin and, on either one or both sides of the film, a tacky coating of a solution of a phenol-formaldehyde resole resin and a polyvinyl acetal resin.

The weight ratio of phenol-formaldehyde resin to non-volatile solvent may vary widely but preferably lies within the range 2:1 to 1:2, and the weight of the polyvinyl acetal should be between 1% and 10%, preferably between 1% and 4%, of the combined weights of the resin and non-volatile solvent.

Fillers, dyes, pigments or antioxidants may be also included in the formulation. Volatile solvents such as lower alcohols may be added to reduce viscosity and so facilitate spreading of the tacky substance on the substrate of the film adhesive, but these solvents must be removed by evaporation when the spreading operation has been completed.

The following example will serve to illustrate the invention:

*Example*

A self-sustaining film adhesive, prepared as described in Example I of U.S. Patent No. 2,872,365, granted February 3, 1959, to Norman Adrian De Bruyne et al., and having on one side a strippable polythene backing sheet, was passed under a doctor blade, the clearance between blade and film being 0.0075 cm., and coated with a layer of a composition comprising:

300 parts by weight phenol-formaldehyde resole obtained by evaporation to 90% solids of the resin described in Example I of the above-mentioned patent.
150 parts by weight polypropylene glycol, average mol. wt. 1025.
4.5 parts by weight polyvinyl butyral (grade 72A manufactured and sold by Shawinigan Limited).
10.5 parts by weight precipitated silica.
100 parts by weight Industrial Methylated Spirit.

The solvent was evaporated from the coating by infrared lamps. The film was then wound upon itself, the strippable polythene acting as a separater.

Adherends of aluminum alloy sheet (16 S.W.G.) coated on both surfaces with a layer of pure aluminum were pretreated by immersing for 30 minutes at 65° C. in a chromic acid solution prepared by dissolving 15% by volume concentrated sulfuric acid and 7½% by weight sodium bicarbonate in water. After the pretreatment the aluminum test pieces were washed and dried. Using these pretreated adherends and using the film adhesive prepared as described in this example, joints of 1.27 cm. overlap were made between 2.54 cm. wide pieces of the aluminum alloy sheet. The joints in both cases were cured for a period of 30 minutes at 168° C. under a pressure of 7 kg./sq. cm. The resulting joints had a room temperature tensile shear strength of 323 kg./sq. cm., which is equal to the strength of similar joints made with the film before application of the tacky coating.

What is claimed is:
1. A film adhesive which comprises a substrate in film form consisting essentially of a polyvinyl acetal resin and a phenol-formaldehyde resin and coated on at least one side of said substrate a layer of a tacky substance comprising a mixture of a phenol-formaldehyde resole resin and a polyvinyl acetal in a plasticizer, wherein the weight ratio of phenol-formaldehyde resin to plasticizer is from about 2:1 to 1:2 and the weight of the polyvinyl acetal is from about 1 to about 10% of the combined weight of phenol-formaldehyde resin and plasticizer.

2. A film adhesive according to claim 1, wherein the polyvinyl acetal present in the coating is polyvinyl butyral.

3. A film adhesive according to claim 1, wherein the plasticizer is a member selected from the class consisting of trixylenyl phosphate, dibutyl phthalate, a polyethylene glycol of molecular weight 150–700 and a polypropylene glycol of molecular weight 400–2500.

References Cited by the Examiner

UNITED STATES PATENTS

| | | | |
|---|---|---|---|
| 2,392,574 | 1/46 | Brown | 161—258 |
| 2,403,077 | 7/46 | Hershberger | 161—248 |
| 2,411,878 | 12/46 | Hershberger | 161—248 |
| 2,414,474 | 1/47 | March | 161—258 |
| 2,499,134 | 2/50 | De Bruyne | 161—248 |
| 2,566,802 | 9/51 | Kennelly | 117—122 |
| 2,694,028 | 11/54 | Rapp | 161—258 |
| 2,726,222 | 12/55 | Palmquist et al. | 117—122 |
| 2,852,421 | 9/58 | Bergstedt | 117—76 |
| 2,872,365 | 2/59 | De Bruyne et al. | 156—246 |

WILLIAM D. MARTIN, *Primary Examiner.*
MURRAY KATZ, *Examiner.*